United States Patent [19]
Hoshina et al.

[11] Patent Number: 5,526,704
[45] Date of Patent: Jun. 18, 1996

[54] STRUCTURE OF MAGNETOSTRICTIVE TORQUE SENSOR APPLICABLE TO SENSOR FOR DETECTING TORQUE APPLIED TO ROTATABLE SHAFT

[75] Inventors: Atsumi Hoshina; Hideki Kano, both of Atsugi, Japan

[73] Assignee: Unisia Jecs Corporation, Atsugi, Japan

[21] Appl. No.: 332,722

[22] Filed: Nov. 1, 1994

[51] Int. Cl.$^6$ ................................................ G01L 3/02
[52] U.S. Cl. .................. 73/862.335; 73/862.333; 73/862.334
[58] Field of Search ............... 73/862.333, 862.334, 73/862.335, 862.336, DIG. 2, 862.191

[56] References Cited

U.S. PATENT DOCUMENTS

| | | | |
|---|---|---|---|
| 4,887,461 | 12/1989 | Sugimoto et al. | 73/862.334 X |
| 4,899,597 | 2/1990 | Yagi et al. | 73/862.335 |
| 4,907,462 | 3/1990 | Obama et al. | 73/862.335 |
| 4,962,672 | 10/1990 | Yagi et al. | 73/862.335 |
| 5,255,567 | 10/1993 | Miyake et al. | 73/862.333 |
| 5,307,691 | 5/1994 | Miyake et al. | 73/862.333 |

FOREIGN PATENT DOCUMENTS 4-341578  11/1992  Japan .

*Primary Examiner*—Richard Chilcot
*Assistant Examiner*—Elizabeth L. Dougherty
*Attorney, Agent, or Firm*—Foley & Lardner

[57] ABSTRACT

A structure of a magnetostrictive torque sensor is disclosed in which an outer casing; a magnetostrictive shaft supported rotatably by the outer casing via a bearing member and having at least one magnetic anisotropy portion formed thereon; and a resin casing which is installed within the outer casing so as to enclose an outer peripheral end of the magnetostrictive shaft, said resin casing integrating at least pairs of core members, coil-wound bobbins, and excitation and detection coils wound on the coil-wound bobbins by means of a resin molding. In the structure described above, a positional deviation of such the coil bobbins, core members, and so on with respect to the magnetostrictive shaft is prevented by means of a plurality of elastic spacer members or such coil bobbin positioning members. Thus, the positional deviations of the core members and coils in an axial direction of the shaft do not occur. The magnetostrictive shaft is connected between intermediate ends of a rotatable shaft so that a magnitude and direction of a torque applied to the shaft can be measured using an external detection circuitry connected to the coils.

6 Claims, 8 Drawing Sheets

STRUCTURE OF MAGNETOSTRICTIVE TORQUE SENSOR APPLICABLE TO SENSOR FOR DETECTING TORQUE APPLIED TO ROTATABLE SHAFT

BACKGROUND OF THE INVENTION

FIELD OF THE INVENTION

The present invention relates to a structure of a magnetostrictive torque sensor applicable to a sensor which is so constructed as to detect a torque applied to a rotatable shaft and output a signal according to a magnitude and direction of the applied torque.

DESCRIPTION OF THE BACKGROUND ART

U.S. patent application Ser. No. 07/969,056 filed on Oct. 30, 1992, Ser. No. 08/068,668 filed on May 28, 1993, and Ser. No. 08/222,809 filed on Apr. 5, 1994 exemplify a previously proposed structure of a magnetostrictive torque sensor, the sensor being inserted in an electric bridge circuit to output a signal according to a magnitude and direction of the torque applied to a magnetostrictive shaft interposed between intermediate ends of a rotatable shaft.

SUMMARY OF THE INVENTION

It is an object to provide an improved structure of the magnetostrictive torque sensor which is capable of maintaining its performance against a strict use environmental condition in a tightly sealed structure, improves its durability and does not reduce a detection accuracy of the magnetostrictive torque sensor even though it is used for a long term.

The above-described object can be achieved by providing a structure of a magnetostrictive torque sensor, comprising: a) a cylindrical outer casing; b) a magnetostrictive shaft, having generally the same diameter as that of a rotatable shaft, rotatably supported by means of said cylindrical outer casing so as to enable its rotation together with said rotatable shaft, and having a pair of magnetic anisotropy portions formed on its outer surface with a predetermined interval of distance which are so constructed as to change their permeabilities according to a magnitude and direction of a torque applied thereto via the rotatable shaft; c) a pair of bearing members located on both ends of said magnetostrictive shaft so as to journal said magnetostrictive shaft, said pair of bearing members being received by said cylindrical outer casing; d) a resin casing, which is located within said outer casing so as to enclose the outer surface of said magnetostoritcive shaft and is formed by a resin molding; said resin casing fixedly integrating at least pair of core members, coil-wound bobbins, and a pair of coils, each coil located around said megnetostrictive shaft so as to form an inductance together with the corresponding one of said magnetostrictive shaft; and e) means for fixing a position of at least one coil inductance determining means constituted by said pair of core members and pair of coil-wound bobbins with respect to the pair of magnetic anisotropy portions so as to prevent the coil inductance determining means from being positionally deviated from the fixed position.

BEST MODE FOR CARRYING OUT THE INVENTION

Reference will hereinafter be made to the drawings in order to facilitate a better understanding of the present invention.

(First Embodiment)

Figure 1:
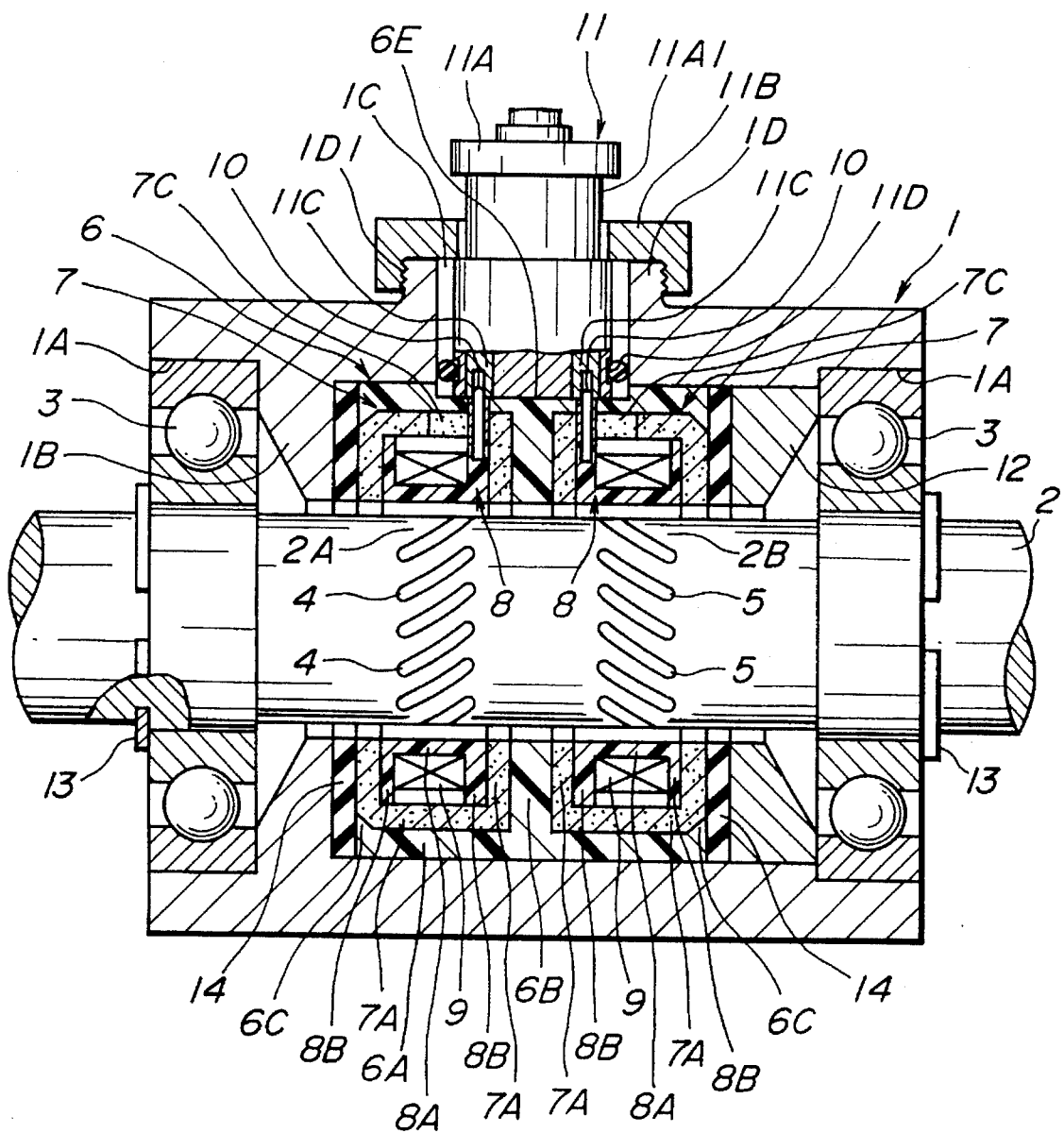
FIG. 1 is a longitudinally cross sectioned view of a magnetostrictive torque sensor for explaining a structure thereof in a first preferred embodiment according to the present invention.
Figure 2:
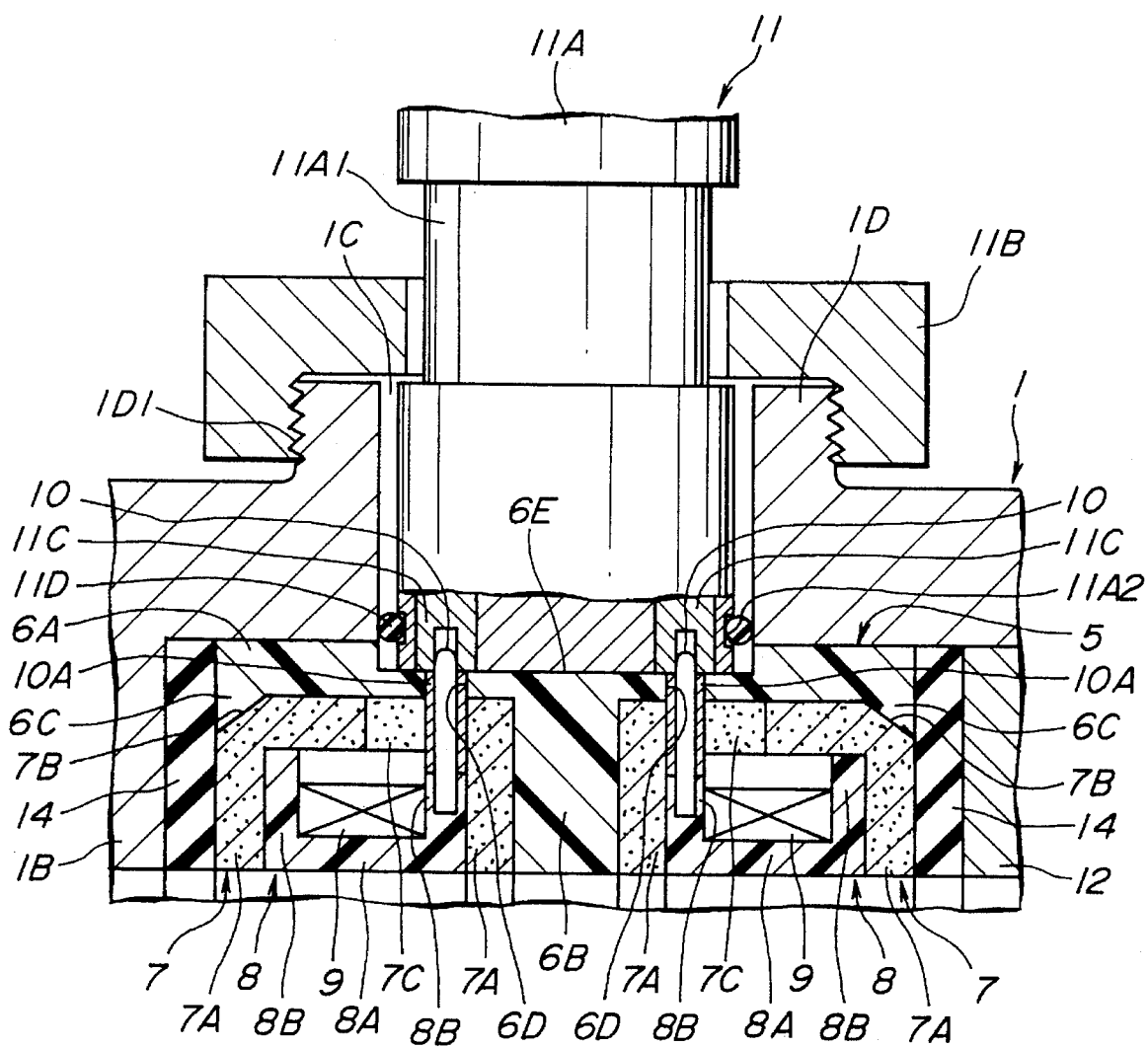
FIG. 2 is an enlarged cross sectional view indicating an essential part of FIG. 1.

FIGS. 1 through 2 show a first preferred embodiment of the magnetostrictive torque sensor according to the present invention.

A cylindrically shaped outer casing 1 is fixed onto a part of a vehicle body (not shown) and is provided with stepped ball bearing receiving portions 1A and 1A located on both ends thereof in an axial direction of a magnetostrictive shaft 2. An annular positioning step 1B is formed on a portion of the outer casing 1 adjacent to each one of the bearing receiving portions 1A and is projected radially from a portion of the outer casing 1 contacted with each one of the ball bearings 1A toward an inner direction to the magnetostrictive shaft 2. A hole 1C penetrated through an axially center portion of the outer casing 1 is disposed radially in the outer casing 1 so as to serve as an inserting hole of connectors to coils (as will be described later) and an annular connector attaching portion 1D is formed on an outer periphery of the hole 1C and is projected radially toward an outside from the outer casing main body 1. It is noted that a male screw portion 1D1 is formed on an outer peripheral surface of the connector attaching portion 1D.

The magnetostrictive shaft 2 is rotatably supported on the pair of ball bearings 3 and 3 received by the respective bearing receiving portions 1A of the outer casing 1 and constitutes a part of a propeller shaft, output axle of a vehicular engine, a drive shaft, or so forth.

The magnetostrictive shaft 2 is cylindrically formed of, for example, a magnetic material such as a chromemolybdenum steel and has an intermediate outer surface in its axial direction formed with a pair of magnetic anisotropy portions 2A and 2B mutually spaced apart with a constant distance from each other and with a center of the shaft 2. One of the pair of magnetic anisotropy portions 2A is formed with a plurality of inscribed slit portions 4, 4, 4, - - -, tilted at 45 degree angles left-sided downward with respect to the radial direction on its periphery surface of 2A. On the other hand, the other magnetic anisotropy portion 2B is formed with a plurality of inscribed slit portions 5, 5, 5, - - -, tilted at 45 degree angles right-sided downward with respect to the radial direction on its periphery surface.

A resin casing 6 is formed in a stepwise cylindrical shape so as to enclose an interval of distance between the one magnetostrictive anisotropy portion 2A and the other magnetostrictive anisotropy portion 2B from an outside thereof and is located within the outer casing 1. The resin casing 6 integrates each core member 7, each coil-wound bobbin 8, and each coil 9 by means of a resin molding.

An annular convex portion 6B is formed on the resin casing 6 at the intermediate portion of a cylindrical portion 6A in its axial direction and is projected radially from the resin casing main body 6 toward an inner direction. Both ends of the cylindrical portion 6A are formed with annular stopper portions 6C and 6C in triangular shapes of cross section as shown in FIG. 2. Each core member 7 is interposed between one of the annular convex portions 6B and one of the core members 7 so as to position each core member 7 in its axial direction.

A plurality of terminal pin holes 6D, 6D (in the first embodiment, two thereof are shown and as the total four pin holes) which are placed at both sides of the annular convex portions 6B on the cylindrical portion 6A of the resin casing 6 are totally four fitted thereinto for respective terminal pins 10 as will be described later. Furthermore, at the intermediate portion of the resin casing 6, a chamfering portion 6E is formed on an outer peripheral surface of the resin casing 6 on which the respective pin holes 6D are positioned, tip ends of a four-terminal connector 11 being contacted with the chamfering portion 6E as will be described later.

A pair of core members 7 and 7 are disposed within the resin casing 6, each core member 7 being formed cylindrically by impinging a pair of core pieces 7A and 7A formed in a letter L shape of cross section on each other, the pair of core pieces 7A and 7A being made of magnetic materials such as ferrite. As shown in FIG. 2, tapered surface portions 7B and 7B are formed on outer peripheral surfaces of the respective core pieces 7A. Each tapered surface portion 7B is enclosed with respective one of annular stop portions 6C of the resin casing 6 from its outside. In addition, the core piece 7A of each core member 7 placed in a proximity to the annular convex portion 6B of the resin casing 6 is formed with a V-shaped slit 7C communicated with each terminal pin 6D of the resin casing 6. The respective terminal pins 10 are inserted into the slit 7C. A minute air gap is formed between each core member 7 and magnetostrictive shaft 2.

A pair of coil-wound bobbins 8 and 8 are disposed on the respective inner peripheral sides of core members 7 and include axis portions 8A formed cylindrically by means of an insulating resin material and annular alligator-shaped portions 8B and 8B formed so as to be extended radially toward its outside direction from both ends off the axis portion 8A.

Excitation and detection coils 9 and 9 are wound on the respective axis portions 8A of the respective bobbins 8. The one ends and other ends of the respective windings of the respective coils 9 are electrically connected to the respective terminal pins 10 by means of soldering.

Each coil 9 is connected to a detection circuitry via the four terminal connectors 11 including a bridge circuit, an oscillator, and a differential amplifier located external to the outer casing.

The detection circuitry is exemplified by U.S. patent application Ser. No. 07/969,056 filed on Oct. 30, 1992, Ser. No. 08/068,668 filed on May 28, 1003, and Ser. No. 08/222,809 filed on Apr. 5, 1994 which are herein incorporated by reference.

Each coil 9 serves as the excitation coil generating magnetic flux excited in response to a high frequency alternating voltage from the oscillator and serves as the detection coil detecting the magnetic flux flowing through a magnetic circuit.

The totally four terminal pins (only two are shown) which are projected radially toward an outer direction from the annular alligator portions 8B from the respective coil bobbins. Each terminal pin 10 is disposed so as to penetrate through a cylindrical insulating body 10A within each terminal pin 6D of the resin casing 6 and the slits 7C of the respective core members 7, each terminal pin 10 being projected within the connector inserting hole 1C of the outer casing 1.

The four-terminal connector 11, as shown in FIG. 2, includes a connector main body 11A formed in a stepped cylindrical shape and having an annular grooved portion 11A2 at its tip end (bottom side) and a fixing nut 11B in a shape of bag disposed movably on an outer peripheral side of the annular stepped portion 11 of the connector main body 11A. The totally four pin inserting portions 11C, 11C, - - - (two are shown) through which the respective terminal pins 10 are penetrated and an O ring 11D are attached onto the annular grooved portion 11A2.

Here, the respective terminal pins 10 are inserted into respective pin inserting portions 11C projected from the annular alligator portions 8B of the respective coil bobbins 8 so that the terminal pins 10 electrically connect each coil 9 to the outer electrical detection circuitry.

In addition, the four-terminal connector 11 inserts the connector main body 11A through the connector inserting hole 1C of the outer casing 1 so that the respective pins 10 are inserted through the respective pin inserting portions 11C. Thereafter, the fixing nut 11B is spirally attached onto the male portion 11D1 of the connector attaching portion 1D so as to be fixed to the outer casing 1. The O ring lid attached onto the annular grooved portion 11A2 serves to prevent water and/or oil leakage into a clearance between the chamfering portion 6E of the resin casing 6 and a tip end surface of the four-terminal connector 11 from being invaded.

An annular fixing member 12 is disposed at the other side of the outer casing 1 so as to face against the positioning stepped portion 1B in its axial direction, the fixing member 12 serving to fix the resin casing 6 into the outer casing 1 so as to make the fixing member 12 contact with the corresponding bearing 3 at the other side thereof.

That is to say, when the resin casing 6 is fixed into the outer casing 1, respective one ends of elastic spacers 14 as will be described later are inserted toward the one side from the other side of the outer casing 1 to the other side so as to be brought into close contact with the positioning stepped portion 1B of the outer casing 1 and, thereafter, the resin casing 6 is inserted so as to bring the elastic spacers 14, 14 into contact with the respective elastic spacers. Then, the other sides of the respective elastic spacers 14 are inserted into the other side of the resin casing 6 and, thereafter, the fixing member 12 is inserted and fitted into the other side of the outer casing 1 so that the other bearing 3 is received into the bearing portion 1A under pressure so as to position it into the outer casing 1. Each elastic spacer 14 is pressed between the resin casing 6 and casing 1 and is grasped in an elastic deformation state.

C-shaped rings 13, 13 serve to position relatively between the magnetostrictive shaft 2 and bearings 3 and 3. Each C ring 13 serves to position an inner ring side of the corresponding one of the bearings 3 in an axial direction of the magnetostrictive shaft 2. The C-shaped rings 13 serve to hold the magnetostrictive shaft 2 relatively rotatably with respect to the outer casing 1. Thus, the slits 4 and 5 of the magnetic anisotropy portions 2A and 2B are radially faced against each other and the pair of core members 7 (each coil 9) are radially faced against each other via a minute air gap.

The plurality of elastic spacers 14, 14 are formed annularly each with, for example, fluorin-contained rubber. The one of the elastic spacers 14 is grasped by one side surface of the resin casing 6 and between the end surface of the one of the core members 7 and the positioning stepped portion 1B of the outer casing 1. The other of the elastic spacers 14 is grasped by the other side surface of the resin casing 6 and between the end surface of the other core member 7 and fixing member 12 so that the plurality of elastic spacers 14 are pressed against the respective ends of the resin casing 6 in their elastically deformed states.

In the first embodiment, the magnetostrictive sensor is constructed as described above.

When the alternating voltage is applied to each coil 9 from the oscillator of the detection circuitry, the magnetic flux generated from each coil 9 causes the magnetic circuit from each core member 7 to the magnetostrictive shaft 2 to be formed. When a torque is applied to the magnetostrictive shaft 2, inductances of the respective coils 9 are varied by means of the slits 4 and 5 so that a detection signal according to the magnitude and direction of the applied torque onto the magnetostrictive shaft 2 can be obtained.

In the first embodiment, since the respective elastic spacers 14 are installed at both ends in the axial direction of the resin casing 6 and are located between the outer casing 1 and resin casing 6 and the resin casing 6 is positioned via the fixing member 12 so that elastic forces caused by the respective elastic spacers 14 press equally against the resin casing 6 from both ends of the axial direction of the outer casing 1, thus the resin casing 6 being faced accurately with the magnetostrictive shaft 2 within the casing 1.

In addition, since the torque sensor is actually mounted in the automotive vehicle, elastic recovering forces of the respective elastic spacers 14 absorb variations in dimensions of the resin casing 6 in its axial direction generated due to temperature-dependent variations and/or aging effects. Consequently, the positional deviations of the resin casing 6 with respect to the outer easing 1 can be prevented.

In the first embodiment, the positional deviations in the axial direction between the magnetic anisotropy portions 2A and 2B of the magnetostrictive shaft 2 and the respective core members 7 (each coil 9) within the resin casing 6 can be prevented for a long term. The generation of deviations due to the vibrations with respect to the axial direction of the outer casing 1 can be prevented.

The resin casing 6 has annular stopping portions 6C at both ends of the respective cylindrical portions 6A so that the respective core members 7 are enclosed externally to prevent the core members 7 from being drawn out. Therefore, it is not necessary to form the resin casing 6 so as to perfectly enclose the end surfaces of the respective core members 7 so that volumes of the resin casing 6 can be decreased. The material cost of resin casing 6 can be reduced and the dimensional variations due to the aging effects can effectively be reduced. The positional deviations can be reduced as described above.

(Second Embodiment)

Figure 3:
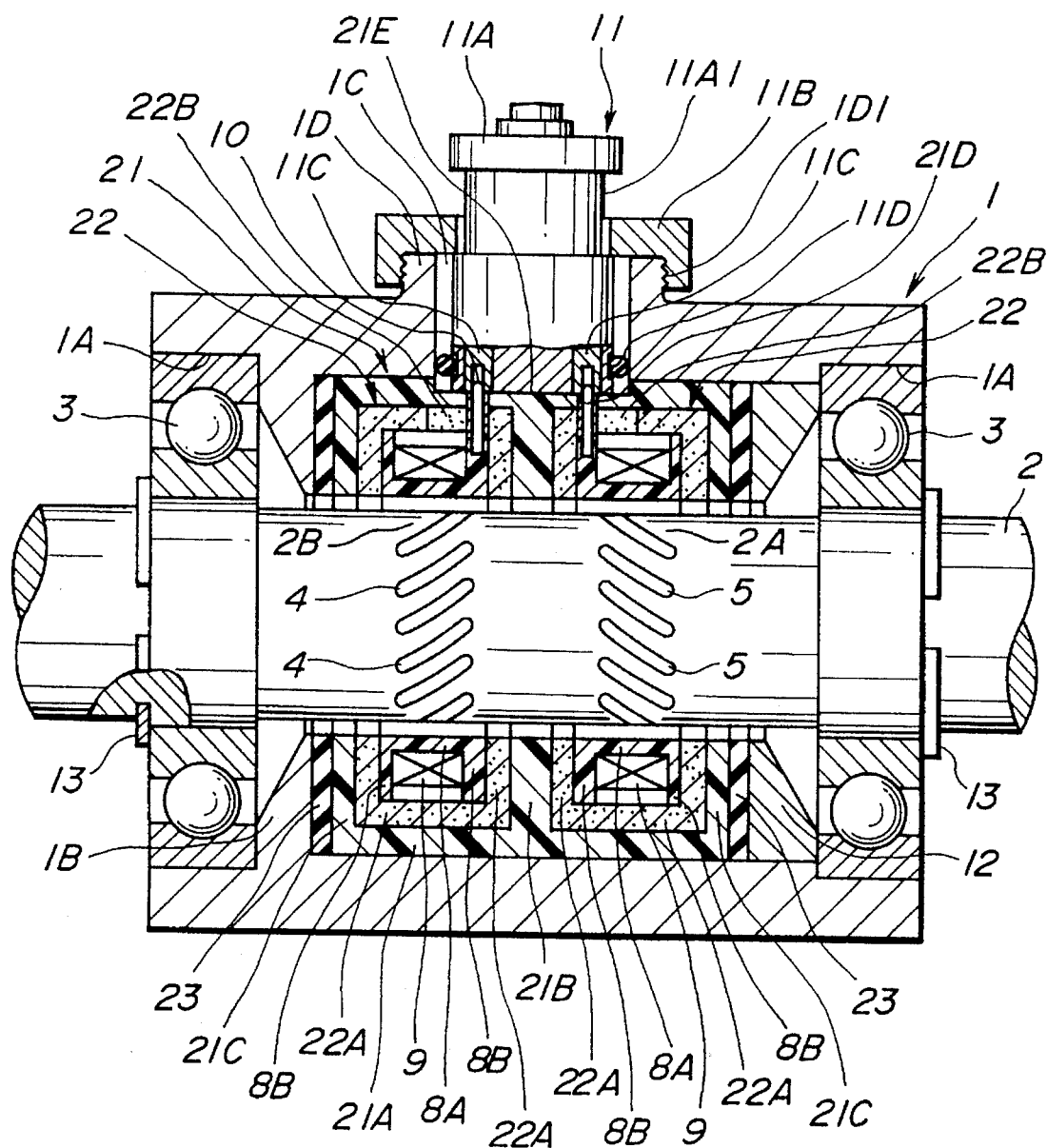
FIG. 3 is a longitudinally cross sectioned view of the magnetostrictive torque sensor in a second preferred embodiment according to the present invention.

FIG. 3 shows a second embodiment of the magnetostrictive torque sensor according to the present invention.

In the second embodiment shown in FIG. 3, the same reference numerals designate like elements of the first embodiment shown in FIGS. 1 and 2.

A feature of the second embodiment is such that the resin casing 21 installed within the outer casing 1 is formed with cylindrical portion 21A, an annular convex portion 21B, and each annular alligator portion 21C in a letter E shape of cross section. Each core member 22 is disposed between the annular alligator portion 21B and each annularly shaped alligator portion 21C and the respective annular elastic spacers 23 are contacted with end surfaces of the annularly shaped alligator portions 21C in their elastically deformed states.

The resin casing 21 in the second embodiment is similarly formed as the corresponding resin casing 6 in the first embodiment described in the first embodiment except the respective annular alligator portions 21C and is provided with respective terminal pin holes 21D and chamfering portion 21E. Each annularly shaped alligator portion 21C of the resin casing 21 is projected radially from both ends in the axial direction toward the magnetostrictive shaft 2 so as to enclose the end surfaces of the respective core members 22 between the annular convex portion 21D. Each core member 22 is formed with the core pieces 22A, 22A having the letter L shaped cross sections impinged thereon together and is provided with V-shaped slits 22B, in the same way as those in the first embodiment. Each elastic spacer 23 is similarly formed with the elastic spacers 14 described in the first embodiment so as to position the resin casing 21 within the outer casing 1 elastically.

The same advantages of the second embodiment can be achieved by those in the fist embodiment. Especially, in the second embodiment, each core member 22 can perfectly be enclosed within the resin casing 21 so that the respective core members 22 can effectively be protected from their external vibrations.

Although, in the first and second embodiments, the respective terminal pins 10 are inserted into the pin inserting portions 11C of the four-terminal connector 11, the detection circuitry is arranged outside of the outer casing 1 and wires of the coils may directly be connected to the detection circuitry using the soldering method.

Although, in the first and second embodiments, two-coil type magnetostrictive torque sensor is exemplified, four-coil type magnetostrictive torque sensors may be used. In the latter case, four-coil core members may be integrated into the resin casing.

The present invention is applicable to the torque detection of the output axle of the engine of the vehicle but may be applied to the torque detection of a torque of an output axle of an electric motor.

(Third Embodiment)

FIGS. 4 through 9 show a third preferred embodiment of the structure of the magnetostrictive torque sensor according to the present invention.

In FIGS. 4 through 9, the resin casing 210 is made by means of the resin molding as in the case of the first and second embodiments to integrate core members 220, 220, bobbin assemblies 250, 250, and coils 300 and 300.

A chamfering portion 210B is formed on its outer peripheral surface of the cylindrical portion 210A of the resin casing 210 so as to be exposed to the connection terminal hole 100C of the outer casing 100. Each terminal pin 310 is projected with a predetermined length from the chamfering portion 210B.

The core members 220 and 220 are made of magnetic materials such as ferrite.

Figure 5:
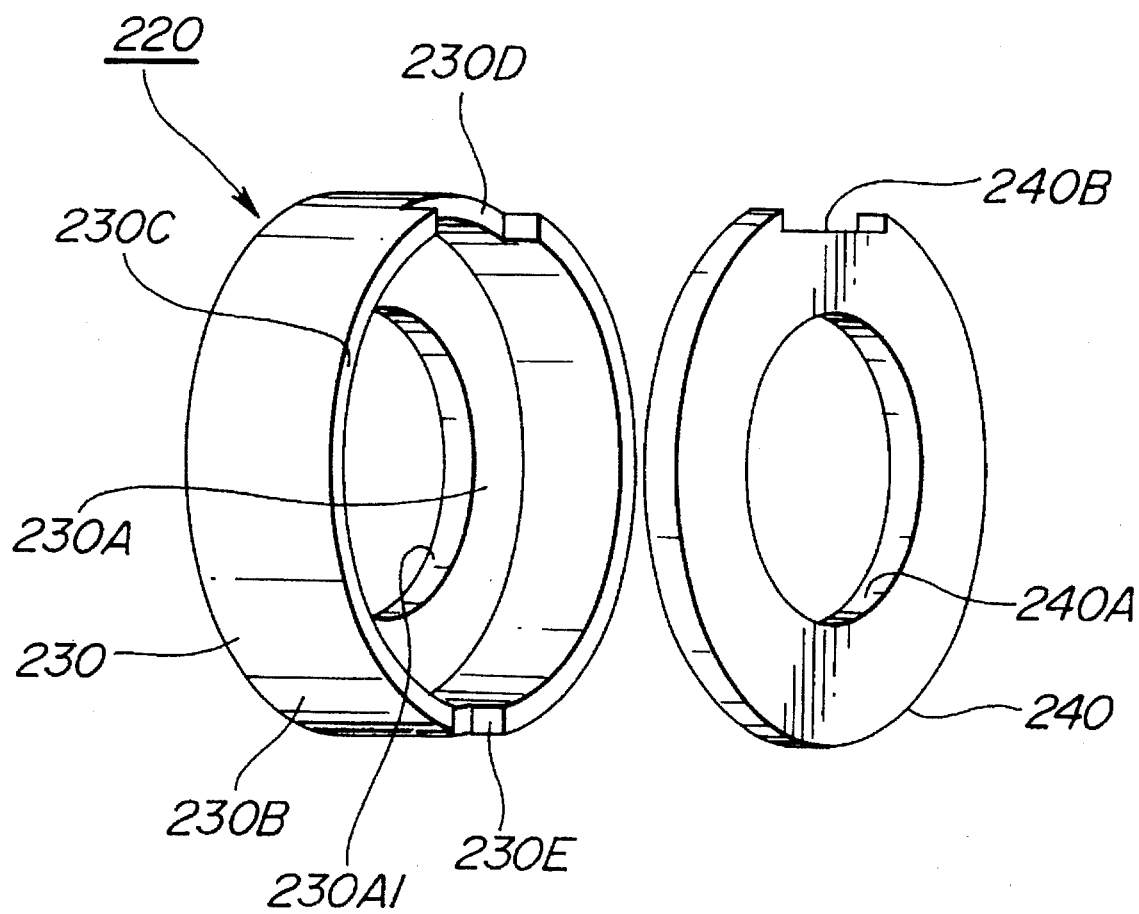
FIG. 5 is an exploded perspective view indicating a core member shown in FIG. 4.

As shown in FIG. 5, each core member 220 includes a cylindrical core piece 230 and annular core piece 240. The cylindrical core piece 230 of each core member 220 includes an annular plate portion 230A having a hole 230A1 through which the magnetostrictive shaft 200 is penetrated at its center and a cylindrical portion 230B. A tip end of the cylindrical portion 230B serves as a contacting surface 230C. In addition, the cylindrical portion 230B is formed with a fitting groove 230D and resin filled groove 230E extended in the axial direction from the contacting surface 230C. The fitting groove 23D is fitted into the linkage portion 280 of each bobbin assembly 250 and serves as a filling outlet to fill the resin material together with the resin filled groove 230E during the molding of the resin casing 210.

Figure 6:
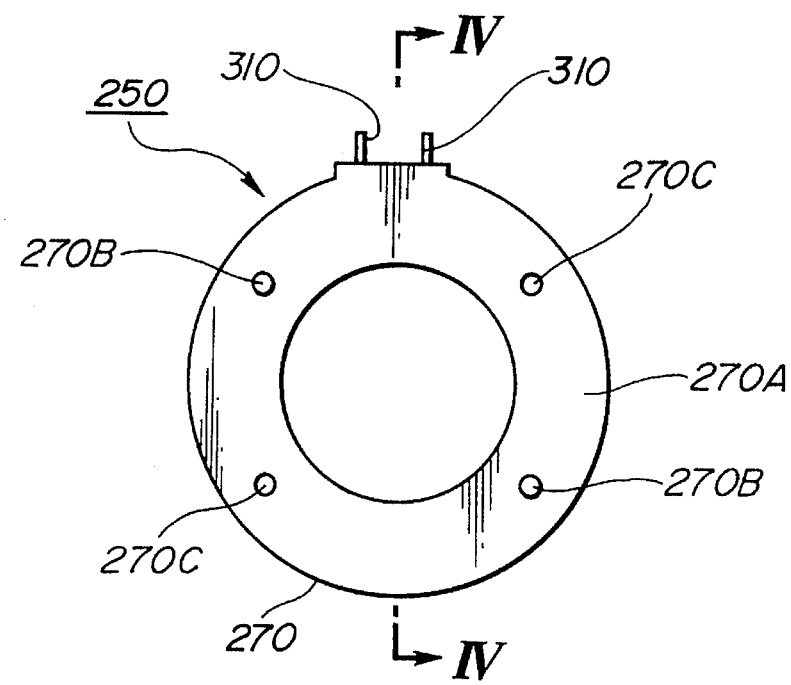
FIG. 6 is an elevational view of a bobbin assembly shown in FIG. 4.
Figure 7:
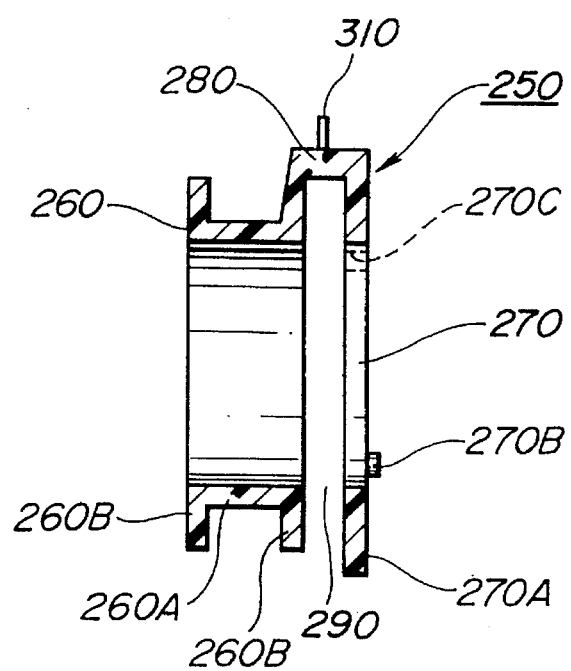
FIG. 7 is a cross sectioned view cut away along a line IV—IV shown in FIG. 6.

On the other hand, each annular core piece 240 is formed annularly corresponding to an annular plate portion 230A of the cylindrical core piece 230 and a penetrating hole 240A is formed on its center portion of each annular core piece 240 through which the magnetostrictive shaft is penetrated. Each annular core piece 24 has its thickness dimension corresponding to the annular core piece inserting portion 290. A fitting groove 240B is formed on an outer peripheral surface side of each annular core piece 240. A pair of bobbin assemblies 250 and 250, each bobbin assembly 250 being constituted by a coil bobbin 260, annular spacer portion 270, and a linkage portion 280, as shown in FIGS. 6 and 7. The respective bobbin assemblies 250 and 250 are formed integrally by means of a resin material.

A coil bobbin 260 includes an axial portion 260A cylindrically formed, annular alligator portions 260B and 260B projected outwardly in the radial direction from both ends of the axial portion 260A.

Annular spacer portions 270 are spaced apart from the coil bobbins 260B and 260B with the predetermined intervals of distances and are installed coaxially with the bobbins 260. The annular spacer portions 270 are integrally formed as an annular flat plate 270 of the bobbin assemblies 250 adjacent to the bobbins 260. Its end surface of the annular flat plate 270 serves as a contacting surface 270A to mate with the annular spacer portion 270 of the bobbin assembly 250 to be the party. The contacting surface 270A is formed with two engagement convex portions 270B and two engagement holes 270C provided in its peripheral direction of the annular spacer portion 270 and alternatingly formed with an angular interval of, e.g., 90 degrees.

Linkage portions 280 serve to link the coil-wound bobbins 260 with the annular spacers 270, the linkage portions 280 being formed approximately in rectangular shapes and one end of the linkage portions 280 being linked to one alligator shaped portion 260B of the bobbins 260 and the other end of the annular spacer portions 270 being linked to the linkage portions 280, respectively.

The linkage portions 280 position the annular spacer portions 270 with the annular spacer portions 270 spaced apart from the bobbins 260 at the predetermined intervals of distances and annular core piece inserting portions 290 are formed between the bobbins 260 and annular spacer portions 270. Each terminal pin 310 is projected upwardly from the upper surface of the linkage portions 280 as shown in FIG. 7. Coils 300 and 300 are wound around outer peripheral surfaces of the axis portions 260A of the respective coil bobbins 260. One and the other ends of the respectively wound coils 300 are connected to the respective terminal pins 310.

Figure 4:
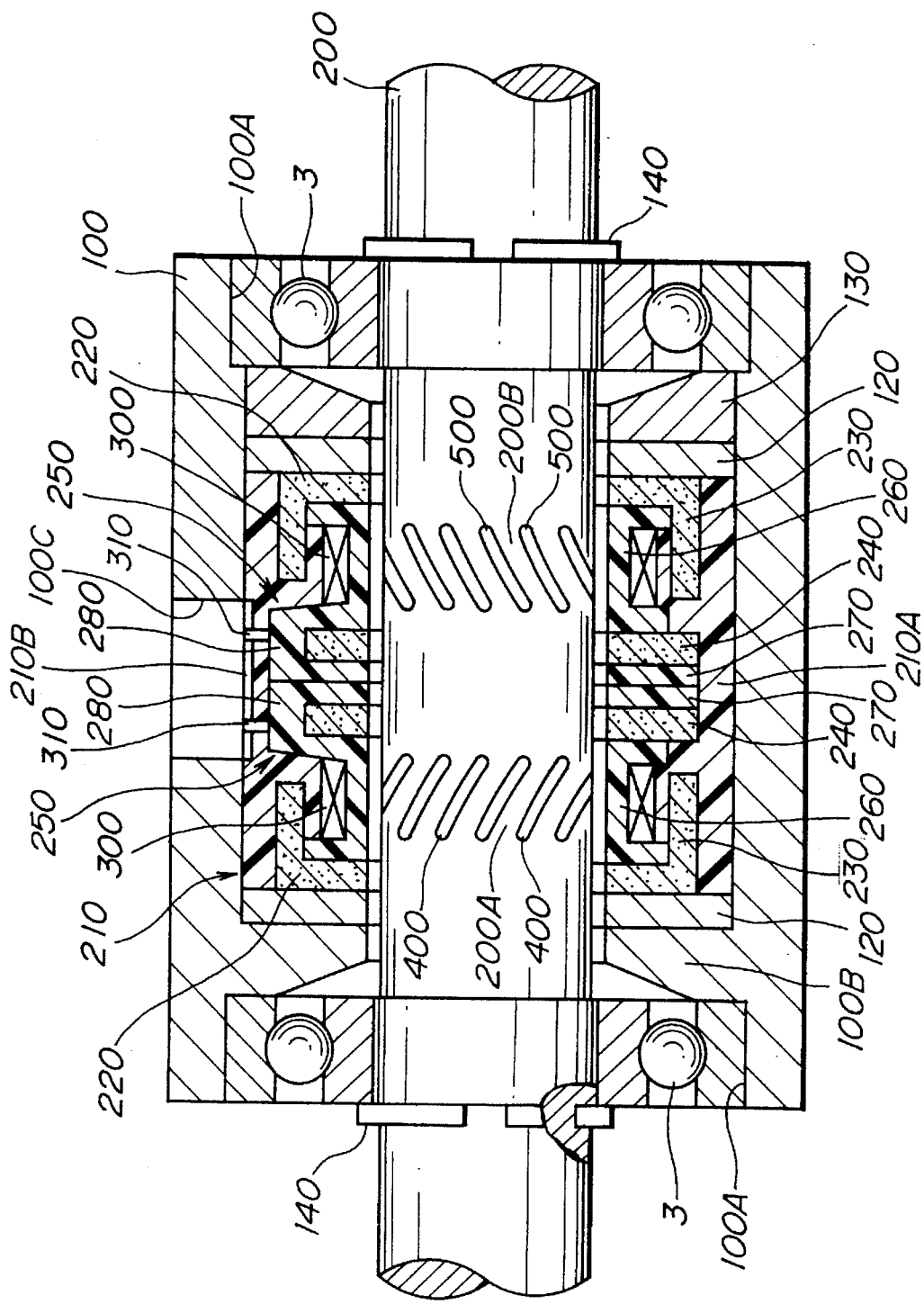
FIG. 4 is a longitudinally cross sectioned view of the magnetostrictive sensor in a third preferred embodiment according to the present invention.

Two terminal pins 310 and 310 are installed on the respective linkage portions 280. As the total, four terminal pins 310 are penetrated through the cylindrical portions 210A of the resin casing 210, as shown in FIG. 4, from the chamfering portion 210B with the predetermined lengths.

Figure 8:
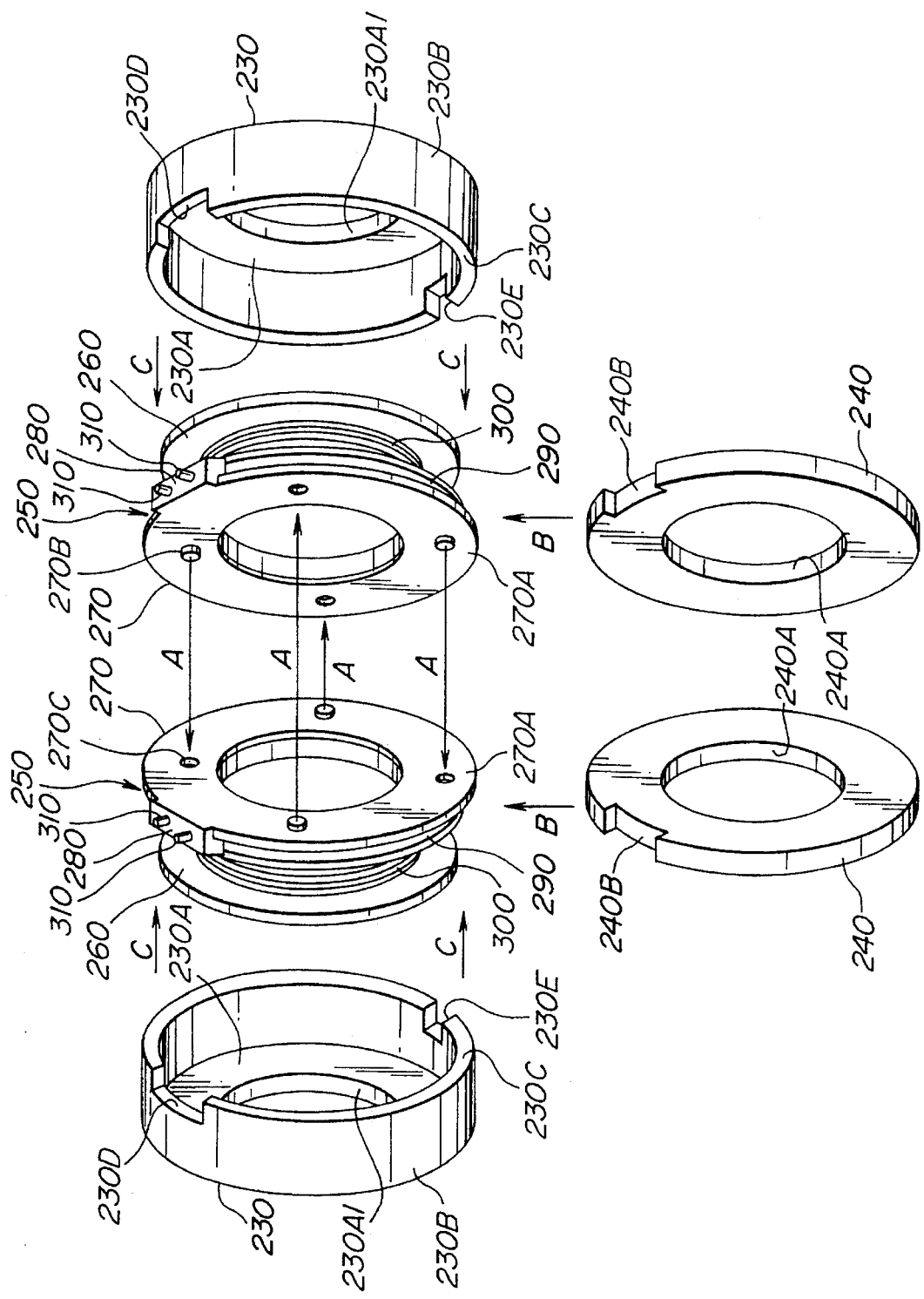
FIG. 8 is an exploded perspective view indicating an assembled state of each core member and each bobbin assembly.

Herein, the assembly operation will be explained such as the respective core members and respective bobbin assemblies with chief reference to FIG. 8.

First, each coil 300 is wound on each coil bobbin 26, the ends of the respective coils 300 being connected to the respective terminal pins 310. The respective linkage portions 280 of the respective bobbin assemblies 250 are mutually positioned. Each engagement convex portion 270B of the respective annular spacer portions 270 is, here, engaged with each corresponding one of the engagement holes 270C in an arrow marked direction of A. Contacting surfaces 270A of each annular spacer portion 270 are mutually contacted and mated with each other.

Next, each annular core piece 240 is inserted from an arrow-marked direction of B into the corresponding annular core piece inserting portions 290 of the respective bobbin assemblies 250. Fitting grooves 240B of the respective annular core pieces 240 are fitted into the linkage portions 280 of the respective bobbin assemblies 250. Each annular contacting surface 230C of the respective core members 230 are contacted with the respective annular core pieces 240, fitting the fitting grooves 230D of the respective annular core pieces 230 into the linkage portions 280 of the respective bobbin assemblies 250. The fitting grooves 230D of the respective cylindrical core pieces 230 are fitted into the linkage portions 280 of the respective bobbin assemblies 250 so that the impinging surfaces 230C of the respective cylindrical core members 230 are impinged on the respective annular core piece 240.

Figure 9:
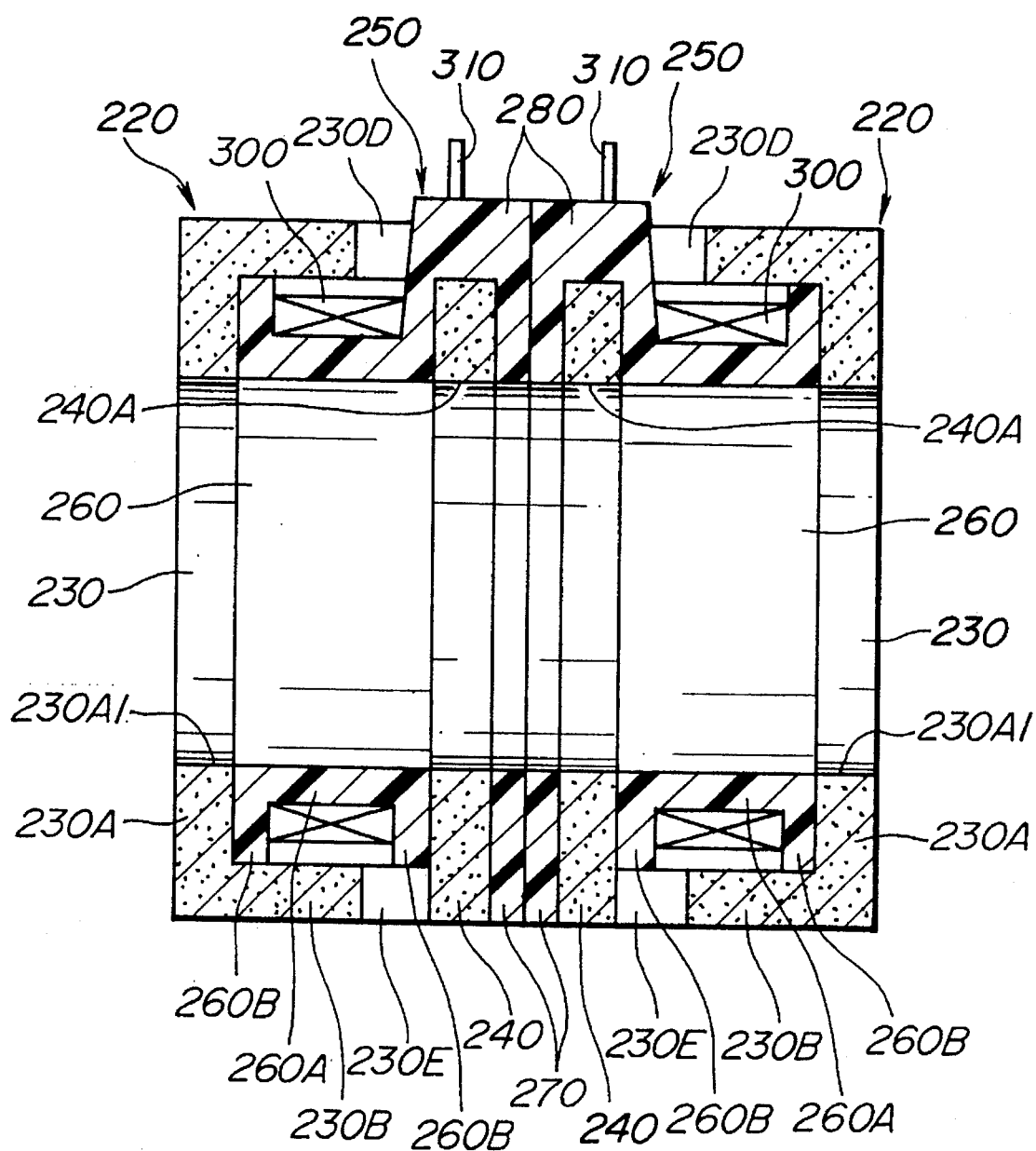
FIG. 9 is a longitudinally cross sectioned view indicating an assembled state of each core member and each bobbin assembly shown in FIG. 8.

In this way, each core member 220 and each bobbin assembly 250 are assembled as shown in FIG. 9. Each bobbin assembly 250 is mutually positioned by fitting the contacting surface 270A into each annular spacer portion 270 by means of the contacting surface 270A with each engagement convex portion 270B mutually engaged with each engagement hole 270C installed on the annular spacer portions 270 of the respective bobbin assemblies 250.

Then, when the respective annular core pieces 240 are inserted and fitted to the annular core inserting portions 290 of the respective bobbin assemblies, the respective annular core pieces 240 are positioned and grasped between the respective coil bobbins 260 and the respective annular spacer portions 270.

Furthermore, the cylindrical core pieces 230 are inserted and fitted into the outer peripheral ends of the respective coil bobbins 260 so that the contacting surfaces 230C of the respective cylindrical core pieces 230 are mated with the surfaces of the annular core pieces 240, the respective cylindrical core pieces 230 being positioned by enclosing the respective coil bobbins 260.

In the way described above, in the third embodiment, since the linkage portions 280 serve to link the respective coil bobbins 260 and annular spacer portions 270 so as to integrate the respective bobbin assemblies 250, the respective engagement convex portions 270B of the respective annular spacer portions 270 are engaged with the respective engagement holes 270C when the annular spacer portions 270 of the respective annular spacer portions 270 of the respective bobbin assemblies 250 are manually impinged on each other. Thus, the respective bobbin assemblies 250 can be positioned and fixed in their peripheral directions and their radial directions. A filling pressure of the resin materials when the resin casing 210 is molded can prevent the coil-wound bobbins 260 (bobbin assemblies 250) from being mutually rotated and can assure the prevention of the respective terminal pins 310 from being deviated. The filling pressure with the resin during molding can prevent a generation of center deviations of the respective coil-wound bobbins 260 (respective bobbin assemblies 250).

In addition, the contacting surfaces 230C of the respective cylindrical core pieces 230 are contacted with the surfaces of the respective annular core pieces 240, when the respective annular core members 240 are inserted and fitted into the respective annular core piece inserting portions 290 and the cylindrical core pieces 230 are inserted and fitted into the respective coil bobbins. Here, the cylindrical core pieces 230 and annular core pieces 240 are accurately positioned by means of the bobbin assemblies 250. The positioning of the respective core members 220 can accurately be carried out during the molding of the resin casing 210.

Hence, in the third embodiment, each core piece 220 and each bobbin assembly 250 can easily be positioned within the resin casing 210. Therefore, the torque detection characteristics for respective products of the whole magnetostrictive torque sensor when they are manufactured can have generally no generation of their torque detection characteristic deviations. An operation efficiency of manufactures can be improved. A yield of the products can remarkably be enhanced.

Since each bobbin assembly 250 forms integrally the coil-wound bobbins 260, annular spacer portions 270, and linkage portions 280, the number of parts of the whole magnetostrictive torque sensor can be reduced. The efficiency of the manufacturing operation can be improved.

Furthermore, since the fitting groove 230D and resin filling groove 230E are disposed on each core member 220, the resin material can positively be filled in the internal peripheral surface of each core member 220 and the space between the outer peripheral surface of each coil bobbin 260 and each coil 300. The windings of the respective coils 300 can be enclosed with the resin material. Therefore, it is not necessary for insulating tapes or so on to be wound over the coils 300.

In the third embodiment, although the respective core members 220 and respective bobbin assemblies 250 are molded within the resin casing 210, the resin casing 210 may be omitted, for example, by directly inserting and fitting the core members 220 and bobbin assemblies 250 in the outer casing 100. In the latter case, each core member 220 and each coil-wound bobbin 260 can mutually be positioned by means of each bobbin assembly 250.

The present invention can equally be applied to the torque detection of the output axle of the electric motor.

While the present invention has been disclosed in terms of the preferred embodiment in order to facilitate better understanding thereof, it should be appreciated that the invention can be embodied in various ways without departing from the principle off the invention. Therefore, the invention should be understood to include all possible embodiments and modification to the shown embodiments which can be embodied without departing from the principle of the invention as set forth in the appended claims.

What is claimed is:

1. A magnetostrictive torque sensor, comprising:
   a) a cylindrical outer casing;
   b) a magnetostrictive shaft, having generally the same diameter as that of a rotatable shaft, rotatably supported by said cylindrical outer casing so as to enable its rotation and having a pair of magnetic anisotropy portions formed on an outer surface of the magnetostrictive shaft portion with a predetermined interval of distance which are constructed and arranged so as to change their permeabilities according to a magnitude and direction of a torque applied thereto via the rotatable shaft:
   c) a pair of bearing members located on both ends of said magnetostrictive shaft portion so as to journal said magnetostrictive shaft portion, said pair of bearing members being fitted into said cylindrical outer casing;
   d) a resin casing, which is located within said outer casing so as to enclose the outer surface of said magnetostorictive shaft portion and is formed by a resin molding; said resin casing fixing and integrating at least a pair of core members, a pair of coil-wound bobbins, and a pair of detection coils, one of each pair of said core members, coil-wound bobbins, and detection coils corresponding to one of said pair of magnetic anisotropy portions, each detection coil located above said magnetostrictive shaft portion so as to form an inductance together with the corresponding one anisotropy portion of said magnetostrictive shaft portion; and
   e) means for fixing a position of at least one coil inductance determining means, constituted by said pair of core members, and said pair of coil-wound bobbins, with respect to the pair of magnetic anisotropy portions so as to prevent the coil inductance determining means from being positionally deviated from the fixed position;
   wherein said pair of coils are wound on the respective coil-wound bobbins and wherein said fixing means includes: annular spacer portions which are arranged on said respective coil-wound bobbins and interposed between the respective core members with their end surfaces impinged on the respective core members, and linkage portions which link outer peripheral surfaces of said annular spacer portions with the respective coil-wound bobbins; and an engagement portion which is located on impinged surfaces of said annular spacer portions and engaged with said annular spacer portions when the respective annular spacer portions are mutually impinged on each other so that the respective coil-wound bobbins are positioned.

2. A magnetostrictive torque sensor as claimed in claim 1, wherein said fixing means comprises:
   f): means, disposed between said resin casing and outer casing and placed at ends of said resin casing in an axial direction of said magnetostrictive shaft, for absorbing a positional deviation of said core members in the axial direction of said magnetostrictive shaft, said absorbing means exerting an elastic recovering force on said resin casing.

3. A magnetostrictive torque sensor as claimed in claim 2, wherein said absorbing means comprises a plurality of elastic spacers disposed between said resin casing and outer casing in elastic deformation states.

4. A magnetostrictive torque sensor as claimed in claim 3, wherein said bearing members comprise ball bearings located on respective ends of the magnetostrictive shaft portion so as to connect the respective ends of the rotatable shaft and the respective ends of the magnetostrictive shaft portion, said magnetic anisotropy portions being located on an inner surface thereof with respect to said ball bearings, said rotatable shaft being an output axle of an internal combustion engine mounted in an automotive vehicle.

5. A magnetostrictive torque sensor as claimed in claim 1, wherein each of said respective core members comprises: a cylindrical core piece disposed on an outer peripheral side of said corresponding one of said coil-wound bobbins; and an annular core piece disposed between said corresponding one of coil-wound bobbins and corresponding one of said annular spacer portions and impinged on a tip end surface of said cylindrical core piece.

6. A method of assembling a torque sensor, comprising the steps of:

a) providing a cylindrical outer casing;

b) providing a magnetostrictive shaft portion provided on an outer surface of a rotatable shaft, rotatably supported by said cylindrical outer casing so as to enable its rotation and having a pair of magnetic anisotropy portions formed on an outer surface of the magnetostrictive shaft portion with a predetermined interval of distance which are constructed and arranged so as to change their permeabilities according to a magnitude and direction of a torque applied thereto via the rotatable shaft;

c) providing a pair of bearing members on both ends of said magnetostrictive shaft portion so as to journal said magnetostrictive shaft portion, said pair of bearing members being fitted into said cylindrical outer casing;

d) forming a resin casing by means of a resin molding, which is located within said outer casing so as to enclose the outer surface of said magnetostorictive shaft portion, said resin casing fixing and integrating at least a pair of core members, a pair of coil-wound bobbins, and a pair of detection coils, each detection coil located above said magnetostrictive shaft portion so as to constitute an inductance together with the corresponding one anisotropy portion of said magnetostrictive shaft portion; and e) fixing a position of at least one coil inductance determining means constituted by said pair of core members and pair of coil-wound bobbins with respect to the pair of magnetic anisotropy portions so as to prevent the coil inductance determining means from being positionally deviated from the fixed position;

wherein said pair of coils are wound on the respective coil-wound bobbins and wherein said step e) includes providing annular spacer portions arranged on said respective coil-wound bobbins and interposed between the respective core members with their end surfaces impinged on the respective core members and providing linkage portions arranged to link outer peripheral surfaces of said annular spacer portions with their respective coil-wound bobbins, and providing an engagement portion which is located on impinged surfaces of said annular spacer portions and engaged with said annular spacer portions when the respective annular spacer portions are mutually impinged on each other so that the respective coil-wound bobbins are positioned.

* * * * *